United States Patent
Podjarny et al.

(10) Patent No.: US 9,009,821 B2
(45) Date of Patent: Apr. 14, 2015

(54) INJECTION ATTACK MITIGATION USING CONTEXT SENSITIVE ENCODING OF INJECTED INPUT

(75) Inventors: Guy Podjarny, Ottawa (CA); Adi Sharabani, Herzlia (IL)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 13/574,011

(22) PCT Filed: Jun. 8, 2011

(86) PCT No.: PCT/EP2011/059508
§ 371 (c)(1),
(2), (4) Date: Jul. 19, 2012

(87) PCT Pub. No.: WO2011/154454
PCT Pub. Date: Dec. 15, 2011

(65) Prior Publication Data
US 2013/0081135 A1    Mar. 28, 2013

(30) Foreign Application Priority Data
Jun. 10, 2010 (CA) ............................ 2704863

(51) Int. Cl.
*G06F 21/00* (2013.01)
*H04L 29/06* (2006.01)
(Continued)

(52) U.S. Cl.
CPC .......... *G06F 21/563* (2013.01); *H04L 63/1441* (2013.01); *H04L 67/02* (2013.01)

(58) Field of Classification Search
None
See application file for complete search history.

(56) References Cited

U.S. PATENT DOCUMENTS 7,343,626 B1 * 3/2008 Gallagher .................. 726/25
2004/0260754 A1 12/2004 Olson et al.
(Continued)

FOREIGN PATENT DOCUMENTS

CN    101296087    10/2008
CN    101350745    1/2009
(Continued)

OTHER PUBLICATIONS

International Search Report for PCT/EP2011/059508, Oct. 28, 2011, 4 pages.
(Continued)

*Primary Examiner* — Izunna Okeke
*Assistant Examiner* — Abdulhakim Nobahar
(74) *Attorney, Agent, or Firm* — Schmeiser, Olsen & Watts LLP

(57) ABSTRACT

A method for preventing malicious code being embedded within a scripting language of a web application accessed by a web browser (308), the method comprising: monitoring all incoming traffic (310), generated by the web browser, and outgoing traffic (326) generated by a server (318) to form monitored traffic; determining whether a unique element, defined in a configuration file, is matched with an input value of the monitored traffic to form a matched input value; responsive to a determination that the unique element is matched with an input value of the monitored traffic, saving the matched input value, determining whether an output contains the matched input value in an expected location; responsive to a determination that the output contains the matched input value in an expected location, encoding the matched input value using a respective definition from the configuration file; and returning the output (330) to the requester.

12 Claims, 5 Drawing Sheets

(51) Int. Cl.
  *G06F 21/56* (2013.01)
  *H04L 29/08* (2006.01)

(56) References Cited

U.S. PATENT DOCUMENTS

| | | |
|---|---|---|
| 2007/0011742 A1 | 1/2007 | Nakayama et al. |
| 2007/0113282 A1 | 5/2007 | Ross |
| 2007/0136809 A1 | 6/2007 | Kim et al. |
| 2008/0034425 A1* | 2/2008 | Overcash et al. ............... 726/22 |
| 2008/0263650 A1 | 10/2008 | Kershbaum |
| 2009/0119769 A1 | 5/2009 | Ross et al. |
| 2010/0125913 A1* | 5/2010 | Davenport et al. ............. 726/25 |
| 2011/0252475 A1* | 10/2011 | Mui et al. ........................ 726/23 |
| 2012/0023090 A1* | 1/2012 | Holloway et al. ............. 707/709 |

FOREIGN PATENT DOCUMENTS

| | | |
|---|---|---|
| CN | 101849238 | 9/2010 |
| EP | 1420562 | 5/2004 |
| WO | 2006025050 | 3/2006 |

OTHER PUBLICATIONS

Ter Louw, M. et al., "BLUEPRINT: Robust Prevention of Cross-site Scripting Attacks for Existing Browsers", 30th IEEE Symposium on Security and Privacy, pp. 33-346, May 2009.

Pietraszek, T. et al., "Defending against Injection Attacks through Context-Sensitive String Evaluation", Recent Advances in Intrusion Detection, Lecture Notes in Computer Science, vol. 3858, pp. 124-145, 2006.

* cited by examiner

INJECTION ATTACK MITIGATION USING CONTEXT SENSITIVE ENCODING OF INJECTED INPUT

RELATED APPLICATIONS

This application is a 371 of pending international application number PCT/EP2011/059508, international filing date of Jun. 8, 2011, which claims priority to Canadian patent application number 2704863, filed Jun. 10, 2010.

TECHNICAL FIELD OF THE INVENTION

This disclosure relates generally to cross-site scripting vulnerabilities in Web applications in a data processing system and more specifically to preventing malicious code being embedded within a scripting language of a web application accessed by a web browser.

BACKGROUND OF THE INVENTION

Cross-Site Scripting (XSS) is a pervasive problem in which, in one form, user input from a client is reflected or echoed back as-is into the returned hypertext markup language (HTML) output from a server. This type of vulnerability means that an attacker can craft a very specific payload, which, when echoed back in the output, includes a script that is executed in the browser. Since the script is returned as a part of the output, the script has access to all cookies and data related to the domain (for example, a web site) that returned the output. Sending the crafted payload to a remote victim will cause the vulnerable site to return the malicious script, allowing the malicious script to fully interact with the vulnerable site, without restrictions applied by a security mechanism of a same origin policy of the browser.

A simplest solution for cross-site scripting is input validation that disallows any character or pattern that may result in a script action in the returned output. Input validation is performed using a positive security model, defining what is allowed, a negative security model, defining what is not allowed, or a combination of models. In both cases, a request that does not meet defined conditions is denied or modified.

In the negative security model, known patterns of attacks for blocking are typically defined. For example, input with the value of "<script>", which is a known attack payload can be blocked. The main challenge in this model is remaining current with all possible exploit patterns that exist, especially when using generic patterns. Negative security input validation will typically not achieve complete protection, and thus if possible, developers are advised to use positive security model.

In the positive security input validation model, a definition may be specified that only alpha numeric characters are permitted, because of the difficulty in successfully exploiting a cross-site scripting issue with only alpha numeric chars. The main challenge with positive security input validation model is a possibility of breaking the application. For example, the logic of the application may require use of possibly dangerous characters, leading to an increasingly difficult task to cover all possible cross-site scripting attack vectors without breaking the function of the application.

An alternate solution for cross-site scripting is to sanitize output by encoding the output. Encoding the input before the input gets added to the output will ensure the browser will not process the received input in the output as a script. Because the input that is echoed back can be added to the output in many different contexts including part of a returned attribute, a value of a tag, within a comment, or within a script tag, the encoding of the input needs to match the specific context.

For example, consider a request in the following code snippets with the URL:
http://server/welcome.jsp?name=John The example returns the name parameter, as-is, in two different contexts, in an output such as:

```
<html><body>
    <H1>Hello, John</H1>
<script><![CDATA[
var user = "John";
//...
]]></script>
    </body></html>
```

To exploit the cross-site scripting in the "Hello" statement, the attacker would send a request such as:
http://server/welcome.jsp?name=John<script>hijack( )</script>

The request is then returned as:

```
<html><body>
<H1>Hello, John<script>hijack( )</script></H1>
<script><![CDATA[
var user = "John<script>hijack( )</script>";
//...
]]></script>
</body></html>
```

The script will be successfully exploited due to the first echoed back content, and the value in the attribute will be a simple value. The solution to this problem would be the use of the HTML encode technique, and specifically replacing the symbol "<" with the symbol of "<".

To exploit the cross-site scripting in the second case, an attacker would send a different request, for example:
http://server/welcome.jsp?name=John";hijack( )//

The request is then returned as:

```
<html><body>
    <H1>Hello, John";hijack( )//</H1>
    <script>
    var user = "John";hijack( ) //";
//...
</script>
        </body></html>
```

The script in the example is successfully exploited because of the second instance of echoed back content and the newly added JavaScript™ code (Java and all Java-based trademarks and logos are trademarks or registered trademarks of Oracle and/or its affiliates). The welcome text remains as plain text. The solution to the problem of the example would be to use the STRING encode technique, which will replace the double-quotes with \" (a backslash+double-quotes).

The solutions just described are valid and well defined, but require modification of the application code, which is a costly and sometimes difficult process, especially when dealing with legacy applications, third party modules, and outsourced applications. Code modification requires time, leaving the system exposed, when already deployed, until the code is fixed.

Automated tools, such as a firewall for a Web application, address this problem by providing an input sanitization solution. Input sanitization typically uses negative security patterns, including elaborate regular expressions that attempt to rule out all possible payloads. This approach is useful, but only a partial solution, because possible variations of cross-site scripting attacks are practically infinite. The tools often offer general negative security rules stating which patterns are not allowed, and allow the user to specify more concrete security rules, but these rules are hard to maintain. Therefore there is a need for an automated solution to injection attacks such as cross-site scripting attacks.

US 2008/0263650 discloses efficient cross-site attack prevention, in which web pages are store on a site. The web pages are organized into entry pages that do not accept input and protected pages that are not entry pages.

US 2007/0113282 discloses a device for receiving and processing data content having at least one original function call including a hook script generator and a script processing engine. The hook script generator is configured to generate a hook script having at least one hook function. Each hook function is configured to supersede a corresponding original function. The hook function provides a runtime detection and control of the data content processing.

US 2004/0260754 discloses a method for mitigating cross-site scripting attacks. When an HTTP request is received from a user computer, the HTTP request is evaluated to determine if it includes a script construct. Particularly, data derived from an outside source that is included in the HTTP request is examined for the presence of script constructs. The presence of a script construct indicates that a cross site scripting attack is being executed and the server computer is able to prevent the attack from being carried out.

BRIEF SUMMARY OF THE INVENTION

According to one embodiment, a computer-implemented process for mitigating injection attacks. The computer-implemented process monitors all incoming traffic and outgoing traffic to form monitored traffic, determines whether a unique element is matched with an input value of the monitored traffic to form a matched input value and responsive to a determination that the unique element is matched with an input value of the monitored traffic, saves the matched input value. The computer-implemented process further determines whether an output contains the matched input value in an expected location and responsive to a determination that the output contains the matched input value in an expected location, encodes the matched input value using a respective definition from a configuration file and returns the output to the requester.

According to another embodiment, a computer program product for mitigating injection attacks, comprises a computer recordable-type media containing computer executable program code stored thereon. The computer executable program code comprises computer executable program code for monitoring all incoming traffic and outgoing traffic to form monitored traffic, computer executable program code for determining whether a unique element is matched with an input value of the monitored traffic to form a matched input value, computer executable program code responsive to a determination that the unique element is matched with an input value of the monitored traffic, for saving the matched input value, computer executable program code for determining whether an output contains the matched input value in an expected location, computer executable program code responsive to a determination that the output contains the matched input value in an expected location for encoding the matched input value using a respective definition from a configuration file, and computer executable program code for returning the output to the requester.

According to another embodiment, an apparatus for mitigating injection attacks comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to monitor all incoming traffic and outgoing traffic to form monitored traffic, determine whether a unique element is matched with an input value of the monitored traffic to form a matched input value, and responsive to a determination that the unique element is matched with an input value of the monitored traffic, save the matched input value. The processor unit further executes the computer executable program code to direct the apparatus to determine whether an output contains the matched input value in an expected location and responsive to a determination that the output contains the matched input value in an expected location, encode the matched input value using a respective definition from a configuration file and return the output to the requester.

Viewed from a first aspect, the present invention provides a method for preventing malicious code being embedded within a scripting language of a web application accessed by a web browser, the method comprising: monitoring all incoming traffic, generated by the web browser, and outgoing traffic generated by a server to form monitored traffic; determining whether a unique element, defined in a configuration file, is matched with an input value of the monitored traffic to form a matched input value; responsive to a determination that the unique element is matched with an input value of the monitored traffic, saving the matched input value, determining whether an output contains the matched input value in an expected location; responsive to a determination that the output contains the matched input value in an expected location, encoding the matched input value using a respective definition from a configuration file; and returning the output to the requester.

Preferably, the present invention provides a method wherein determining whether an output contains the matched input value in an expected location further comprises: determining whether a respective unique element is echoed back in the output; and identifying a location and context associated with a unique element in the output, wherein determining and identifying further include injection of unique values.

Preferably, the present invention provides a method wherein determining whether a unique element is matched with an input value of the monitored traffic further comprises: identifying a page of an application and associated inputs of the page to form a set of identified inputs; transforming each input in the set of identified inputs to form a respective unique element; and resending the input using the respective unique elements.

Preferably, the present invention provides a method wherein identifying a location and context associated with a unique element in the output further comprises: exporting a scan result in the configuration file.

Preferably, the present invention provides a method wherein the configuration file contains a list of each input of the set of identified inputs and respective expected output locations and context.

Preferably, the present invention provides a method wherein responsive to a determination that the unique element is not matched with an input value of the monitored traffic returning to monitoring all incoming and outgoing traffic.

Preferably, the present invention provides a method wherein responsive to a determination that the output does not contain the matched input value in an expected location, encoding the matched input value using a default definition.

Viewed from another aspect, the present invention provides a computer program product for mitigating injection attacks, the computer program product comprising: a computer recordable-type media containing computer executable program code stored thereon, the computer executable program code comprising: computer executable program code for monitoring all incoming traffic and outgoing traffic to form monitored traffic; computer executable program code for determining whether a unique element is matched with an input value of the monitored traffic to form a matched input value; computer executable program code responsive to a determination that the unique element is matched with an input value of the monitored traffic, for saving the matched input value, computer executable program code for determining whether an output contains the matched input value in an expected location; computer executable program code responsive to a determination that the output contains the matched input value in an expected location, for encoding the matched input value using a respective definition from a configuration file; and computer executable program code for returning the output to the requester.

Preferably, the present invention provides a computer program product, wherein computer executable program code for determining whether a unique element is matched with an input value of the monitored traffic further comprises: computer executable program code for identifying a page of an application and associated inputs of the page to form a set of identified inputs; computer executable program code for transforming each input in the set of identified inputs to form a respective unique element; and computer executable program code for resending the output using the respective unique elements.

Preferably, the present invention provides a computer program product wherein computer executable program code for determining whether an output contains the matched input value in an expected location further comprises: computer executable program code for determining whether a respective unique element is echoed back in the output; and computer executable program code for identifying a location and context associated with a unique element in the output, wherein the computer executable program code for determining and identifying further includes computer executable program code for injecting unique values.

Preferably, the present invention provides a computer program product wherein computer executable program code for identifying a location and context associated with a unique element in the output further comprises: computer executable program code for exporting a scan result in the configuration file.

Preferably, the present invention provides a computer program product wherein the configuration file contains a list of each input of the set of identified inputs and respective expected output locations and context.

Preferably, the present invention provides a computer program product wherein computer executable program code responsive to a determination that the unique element is not matched with an input value of the monitored traffic further comprises computer executable program code for returning to monitoring all incoming and outgoing traffic.

Preferably, the present invention provides a computer program product wherein computer executable program code responsive to a determination that the output does not contain the matched input value in an expected location, further comprises computer executable program code for encoding the matched input value using a default definition.

Viewed from another aspect, the present invention provides an apparatus for mitigating injection attacks, the apparatus comprising: a communications fabric; a memory connected to the communications fabric, wherein the memory contains computer executable program code; a communications unit connected to the communications fabric; an input/output unit connected to the communications fabric; a display connected to the communications fabric; and a processor unit connected to the communications fabric, wherein the processor unit executes the computer executable program code to direct the apparatus to: monitor all incoming traffic and outgoing traffic to form monitored traffic; determine whether a unique element is matched with an input value of the monitored traffic to form a matched input value; responsive to a determination that the unique element is matched with an input value of the monitored traffic, save the matched input value, determine whether an output contains the matched input value in an expected location; responsive to a determination that the output contains the matched input value in an expected location, encode the matched input value using a respective definition from a configuration file; and return the output to the requester.

Preferably, the present invention provides an apparatus wherein the processor unit further executes the computer executable program code to determine whether a unique element is matched with an input value of the monitored traffic directs the apparatus to: identify a page of an application and associated inputs of the page to form a set of identified inputs; transform each input in the set of identified inputs to form a respective unique element; and resend the output using the respective unique elements.

Preferably, the present invention provides an apparatus wherein the processor unit further executes the computer executable program code to determine whether an output contains the matched input value in an expected location directs the apparatus to: determine whether a respective unique element is echoed back in the output; and identify a location and context associated with a unique element in the output, wherein directs the apparatus to determine and identify further includes inject unique values.

Preferably, the present invention provides an apparatus wherein the processor unit further executes the computer executable program code to identify a location and context associated with a unique element in the output directs the apparatus to: export a scan result in the configuration file.

Preferably, the present invention provides an apparatus wherein the configuration file contains a list of each input of the set of identified inputs and respective expected output locations and context.

Preferably, the present invention provides an apparatus wherein the processor unit further executes the computer executable program code responsive to a determination that the output does not contain the matched input value in an expected location, to direct the apparatus to encode the matched input value using a default definition.

BRIEF DESCRIPTION OF THE DRAWINGS

A preferred embodiment of the present invention will now be described by way of example only, with reference to the accompanying drawings in which.

DETAILED DESCRIPTION OF THE INVENTION

Figure 1:
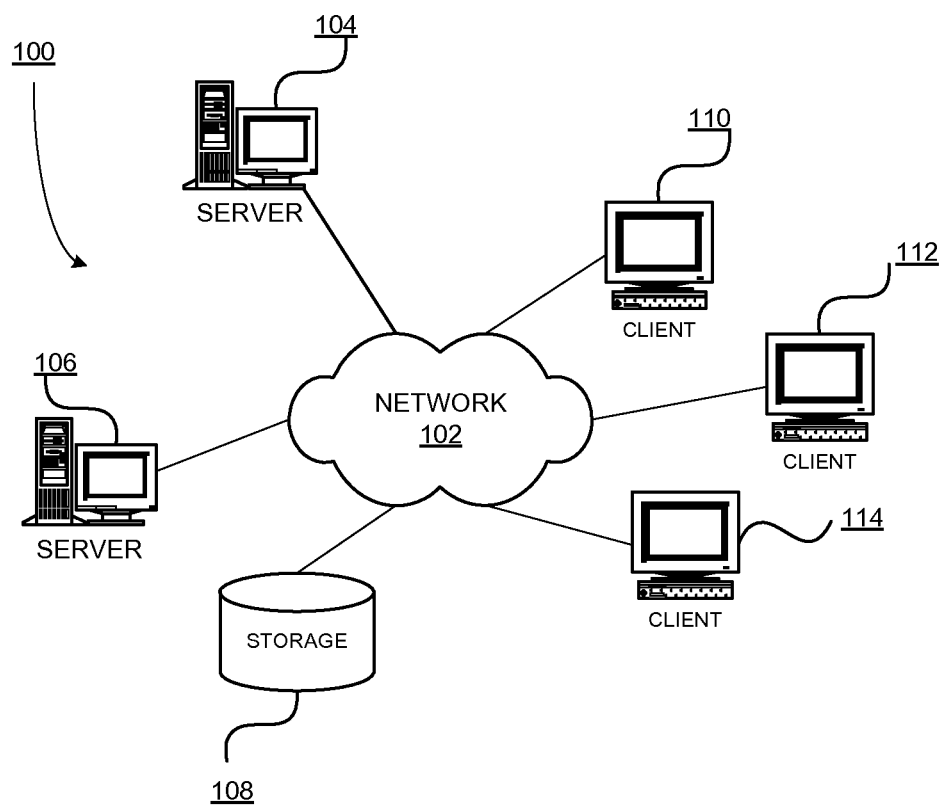
FIG. 1 is a block diagram of an exemplary network data processing system operable for various preferred embodiments of the present invention.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product tangibly embodied in any medium of expression with computer usable program code embodied in the medium.

Computer program code for carrying out operations of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks or registered trademarks of Oracle and/or its affiliates. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
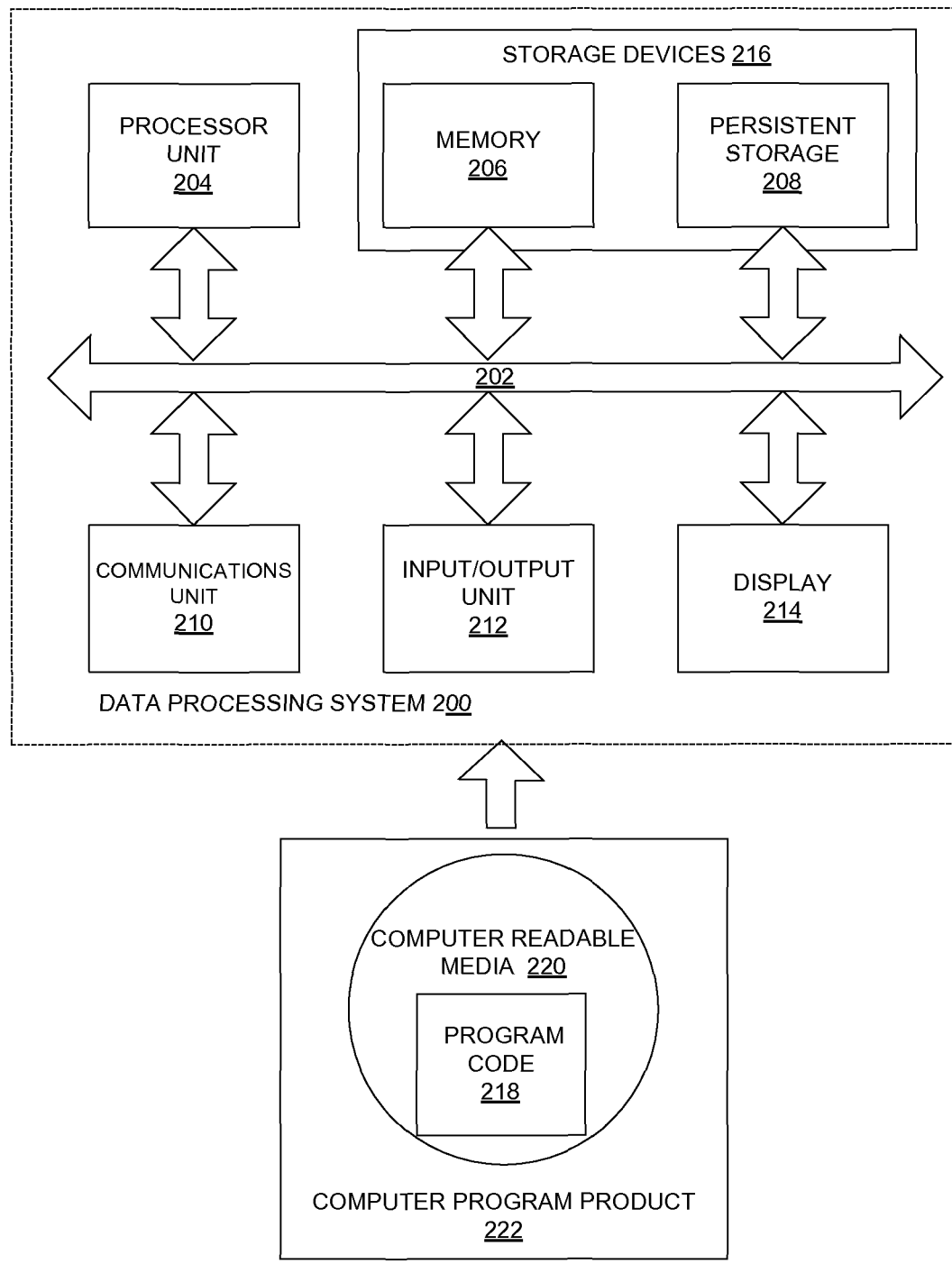
FIG. 2 is a block diagram of an exemplary data processing system in the network data processing system of FIG. 1 operable for various preferred embodiments of the present invention.

With reference now to the figures and in particular with reference to FIG. 1 and FIG. 2, exemplary diagrams of data processing environments are provided in which illustrative embodiments may be implemented. It should be appreciated that FIG. 1 and FIG. 2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Turning now to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 100 of FIG. 1 as an example a server such as server 104 and a client such as client 110, both of FIG. 1, may be implemented on representative systems either separately or on the same system. Further a proxy and a server may be implemented on a same or different server such as server 104 wherein the proxy separates a client such as client 110 from the application server. In one illustrative embodiment of an apparatus for mitigating injection a processor unit such as processor unit 204 of FIG. 2 monitors all incoming and outgoing traffic received through communications unit 210 of FIG. 2 to form monitored traffic. Processor unit 204 determines whether a unique element is matched with an input value of the monitored traffic to form a matched input value and responsive to a determination that the unique element is matched with an input value of the monitored traffic, saves the matched input value in storage devices 216 of FIG. 2. Processor unit 204 further determines whether an output from the application server on server 104 contains the matched input value in an expected location and responsive to a determination that the output contains the matched input value in an expected location, encodes the matched input value using a respective definition from the configuration file. Processor unit 204 returns the output to the requester using communications unit 210.

In another example, a computer-implemented process, using program code 218 stored in memory 206 or as a computer program product 222, for mitigating injection attacks comprises a computer recordable storage media, such as computer readable media 220, containing computer executable program code stored thereon. The computer executable program code comprises computer executable program code for a computer-implemented process for mitigating injection attacks.

In another illustrative embodiment, the process for mitigating injection attacks may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process for mitigating injection attacks.

Figure 3:
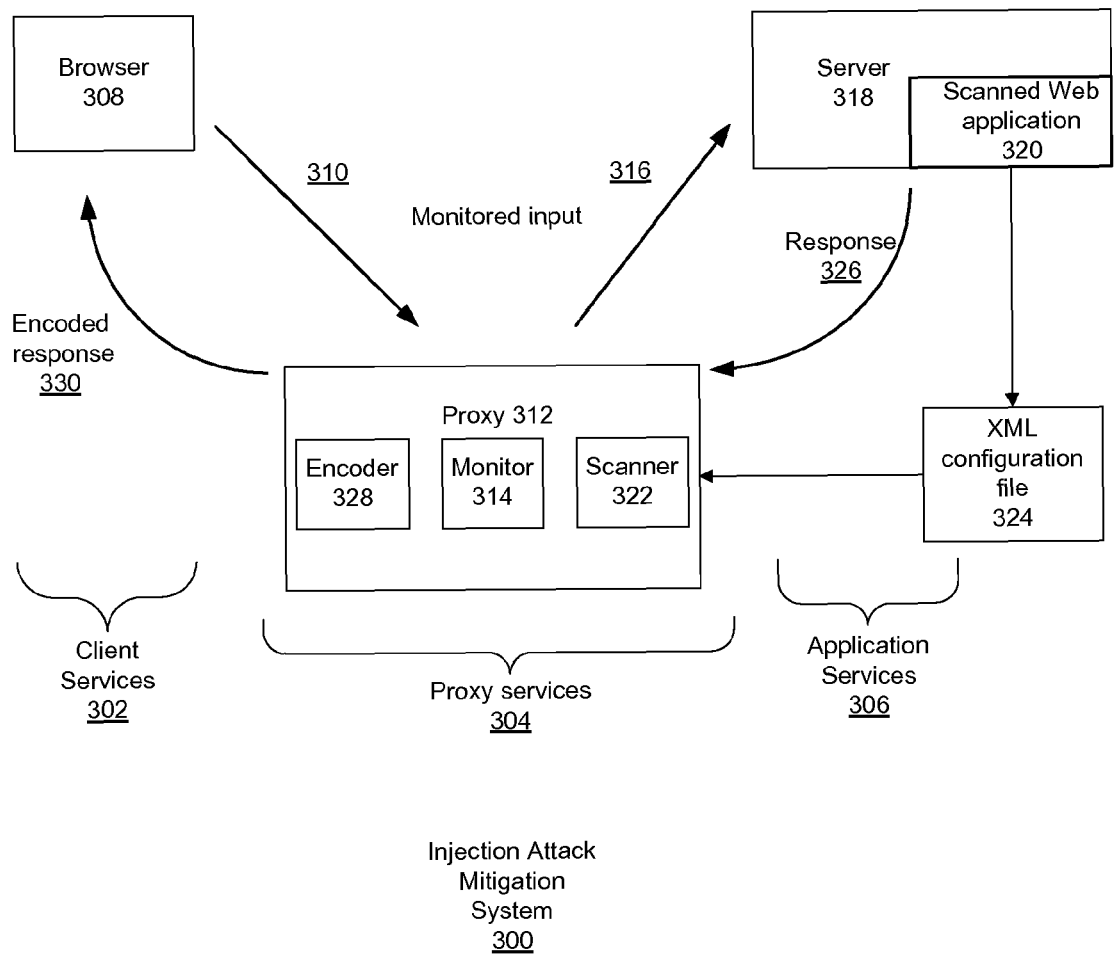
FIG. 3 is a block diagram of an injection attack mitigation system in accordance with various preferred embodiments of the present invention.

With reference to FIG. 3, a block diagram of an injection attack mitigation system in accordance with various embodiments of the disclosure is presented. Injection attack mitigation system 300 is an example of a data processing system enhanced with a capability to mitigate an injection attack including a cross-site scripting attack.

Injection attack mitigation system 300 a number of components in three main areas including those of client services 302, proxy services 304 and application services 306. Client services 302 includes a typical browser such as browser 308 to input such as monitored input 310 and input 316 and to receive an output in the form of encoded output 330.

Proxy services 304 are provided by proxy 312 including monitor 314, scanner 322 and encoder 328. Monitor 314 provides a capability to monitor the incoming and outgoing traffic between browser 308 and server 318. Monitored incoming traffic includes monitored input 310 and input 316 while monitored outgoing traffic includes output 326 and encoded output 330. Monitoring is used to determine what code fragments need to be processed within the input stream and in which context.

Proxy 312 is located logically or physically between browser 308 and a web application, such as scanned web application 320 on server 318 to programmatically encode any input reflected in the output, preventing a reflected input from being interpreted as a script by the hypertext markup language. The implementation will effectively block any cross-site scripting attack, since the injected payload is encoded in the output, and any scripts in the payload will not be executed.

For example, when the parameter value "<script>hijack ( )</script>" is passed, encoder 328 of proxy 312 will replace any occurrence of that value with "<script>hijack ( )</script>." The solution is useful, however there are limitations. While this encoding fits the first scenario described above, the encoding will be incorrect for use in the second reflected location. To sanitize the second occurrence of the input, one needs to use a different encoding method, for example, string encode, which encodes the double quotes using a preliminary backslash. Further as mentioned above, proxy 308 will have to be aware of the context in which the input is echoed back, to identify an appropriate encoding to use.

Using a web application scanner, such as scanner 322, the input that is reflected in the scanned application and the context in which the reflection is made is identified. Scanner 322 will submit a test value on each input field found in monitored input 310, and to determine whether the value was echoed back. For each instance of a value that is echoed back in output 326, a location and a context is identified. Because scanner 322 controls the injected value, scanner 322 uses a value that is unique enough to be easily identified in the returned output. Scanner 322 can also support cases where the same input is echoed back multiple times and in different locations and contexts within the same output. Output of scanner 322 produces a list of the occurrences that may be stored for re-use, for example, in one embodiment in the form of extensible markup language (XML) configuration file 324.

Encoder 328 programmatically encodes input that is reflected in the output 326 to create encoded output 330. Scanner 322 programmatically identifies the appropriate location and encoding for each instance of the input reflected in the output.

The disclosed embodiment is presented in the context of cross-site scripting; the technique described is applicable to all injection-type attacks. For example, when a proxy is able to monitor all the SQL activity, and determine that an input, for example, an hypertext transport protocol parameter value is embedded as-is in a structured query language (SQL) command, the proxy can programmatically encode the value at that identified point. In this example, as in a similar fashion to the cross-site scripting example, the exact area to encode and encoding type to use depends on the context in which the user data is embedded in the structured query language command, implying proxy 312 would need to have the proper information configured in support. To solve this, scanner 322 will inject a unique input and identify where, if at all, the input is injected into the SQL command.

Cross-site scripting is really an example of a hypertext markup language injection attack, where the attacker injects scripts provided by the attacker into the output. In a sense, the input is injected into the hypertext markup language command.

While the examples disclose monitoring for and encoding the entire input that passes in, the illustrative embodiments are equally valid to parts of the input, for example, when the first ten chars of the input are echoed back. For the purpose of the disclosure the full input is managed, but the embodiments include managing parts of the input as well.

Figure 4:
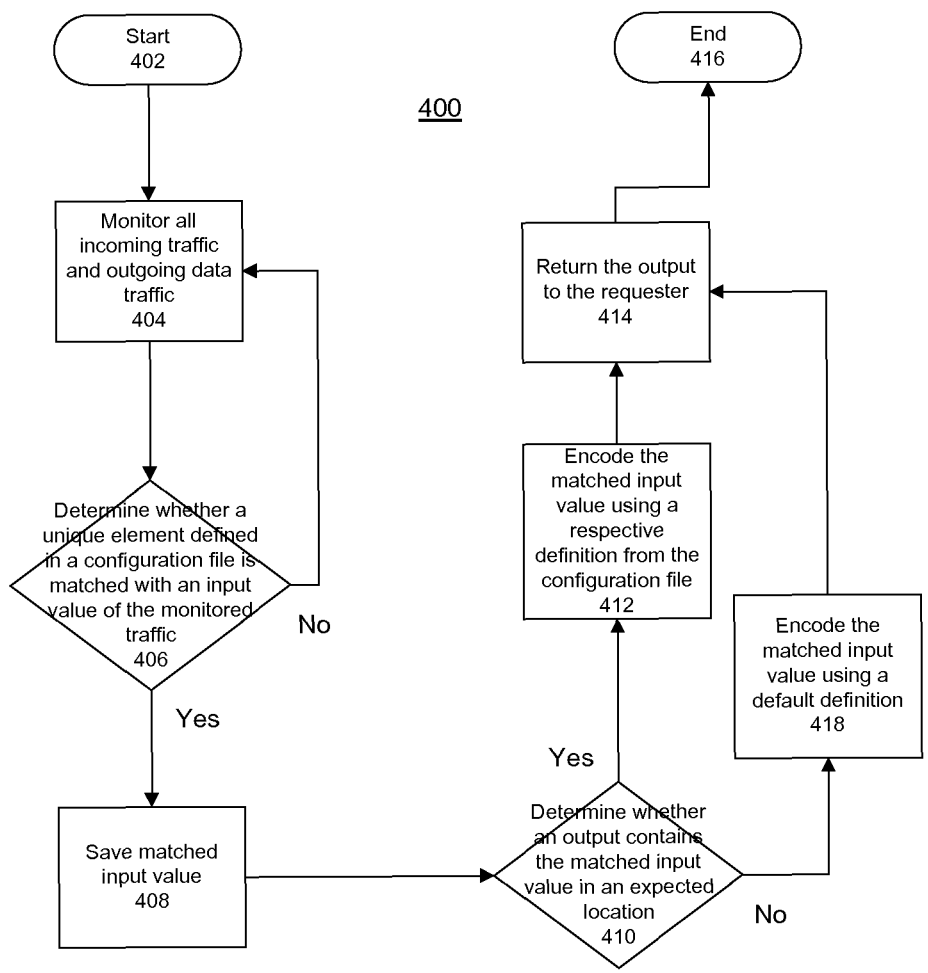
FIG. 4 is a flowchart of a process using the injection attack mitigation system of FIG. 3, in accordance with a preferred embodiment of the present invention.

With reference to FIG. 4, a flowchart of a process using the injection attack mitigation system of FIG. 3, in accordance with one embodiment of the disclosure is presented. Process 400 is an example of a process using injection attack mitigation system 300 of FIG. 3. In the description of the embodiment the following example is used:
Request: http://server/welcome.jsp?name=John
Response:

```
<html><body>
    <H1>Hello, John</H1>
<script><![CDATA[
var user = "John";
//...
]]></script>
    </body></html>
```

Process 400 begins (step 402) and monitors all incoming traffic and outgoing traffic (step 404). Incoming traffic is generated by a browser and flows through a proxy to a Web application on the application server. Outgoing traffic originates on the server and travels through the proxy to the client on the browser.

Process 400 determines whether a unique element defined in a configuration file is matched with an input value of the monitored traffic (step 406). The unique element was created and saved as a result of a web application scan using a scanner such as scanner 322 of FIG. 3. When a determination is made that the unique element defined in a configuration file is matched with an input value of the monitored traffic saved, a "yes" result is returned. When a determination is made that the unique element defined in a configuration file is not matched with an input value of the monitored traffic, a "no" result is returned.

When a "no" result is obtained in step 406, process 400 loops back to perform step 404. When a "yes" is obtained in step 406, process 400 saves a matched input value (step 408). Process 400 determines whether an output contains the matched input value in an expected location (step 410). When a determination is made that the output contains the matched input value in an expected location, a "yes" result is obtained. When a determination is made that the output does not contain the matched input value in an expected location, a "no" result is obtained.

When a "yes" result is obtained in step 410, process 400 encodes the matched input value using a respective definition in the configuration file (step 412). The matched input value is encoded using the information contained within the configuration file including position and context information. An appropriate encoding is therefore used to encode the matched input value included in the output. Process 400 returns the output to the requester (step 414) terminating thereafter (step 416).

When a "no" result is obtained in step 410, process 400 encodes the matched input value using a default definition (step 418) and terminates thereafter (step 416). The default definition is used because the matched input value was identified in a location other than the location disclosed in an entry of the configuration file. Although the location differed, the input value was matched and accordingly encoded for protection.

The proxy thus enforces the protection using the process just described. The proxy receives or accesses the extensible markup language configuration file, and monitors all incoming and outgoing traffic. Whenever an input mentioned in the configuration file is encountered, the proxy saves the value of the input. When an output is formed, the proxy determines whether the input value appears in the expected location or locations, and if so encode the input value based on the configured context or contexts for each input value.

For example, when the "name" parameter has a value of <script>hijack("this")</script>, that value will be modified to become <script>hijack("this")</script> in the first appearance in the output, and become <script>hijack(\"this\") </script> in the second appearance in the output.

Instructions on what input value to encode could become much more complex, including the context describing which additional parameters or cookies appear in the request, an input that is a part of a path, an input that comes after another input, and other typical occurrences. Describing a location in the output can be done in many different ways. The method of location description can vary.

For example, in one embodiment an XPath expression may be used. Using this example, a scanner can normalize the hypertext markup language into extensible hypertext markup language (XHTML), and then use an XML path, XPath expression to describe the location of the returned payload. Using the previous example above, the two locations would be coded using XPath notation as:
/html/body/H1/b/text( )
/html/body/img/@alt/string( ). This example would only work in XPath 2.0.

In another embodiment, regular expressions are used to describe the location in the output. This approach, as well as the XPath approach, will typically ignore less significant parts of the output that are likely to change, because the pages are not very static. One technique used expects the hypertext markup language structure of the output to remain the same, but ignores the content itself.

For example, in the previous example, assuming the use of $1 to describe the output echoed back, the following regular expressions may be used:

```
<html><body>
    <H1>[ <]*, $1</H1>
<script><![CDATA[
var user = "$1";
...
```

To overcome cases where the description was too specific and the input value was echoed back in a different spot, the proxy is enabled to implement a fallback default encoding. The default encoding has a higher probability of breaking the application but will increase the security when used. For example, the proxy is set to use hypertext markup language to encode any appearance of a payload in the output, when that payload is of an input known to echo back data, and therefore from the initial configuration and it is longer than eight characters.

Figure 5:
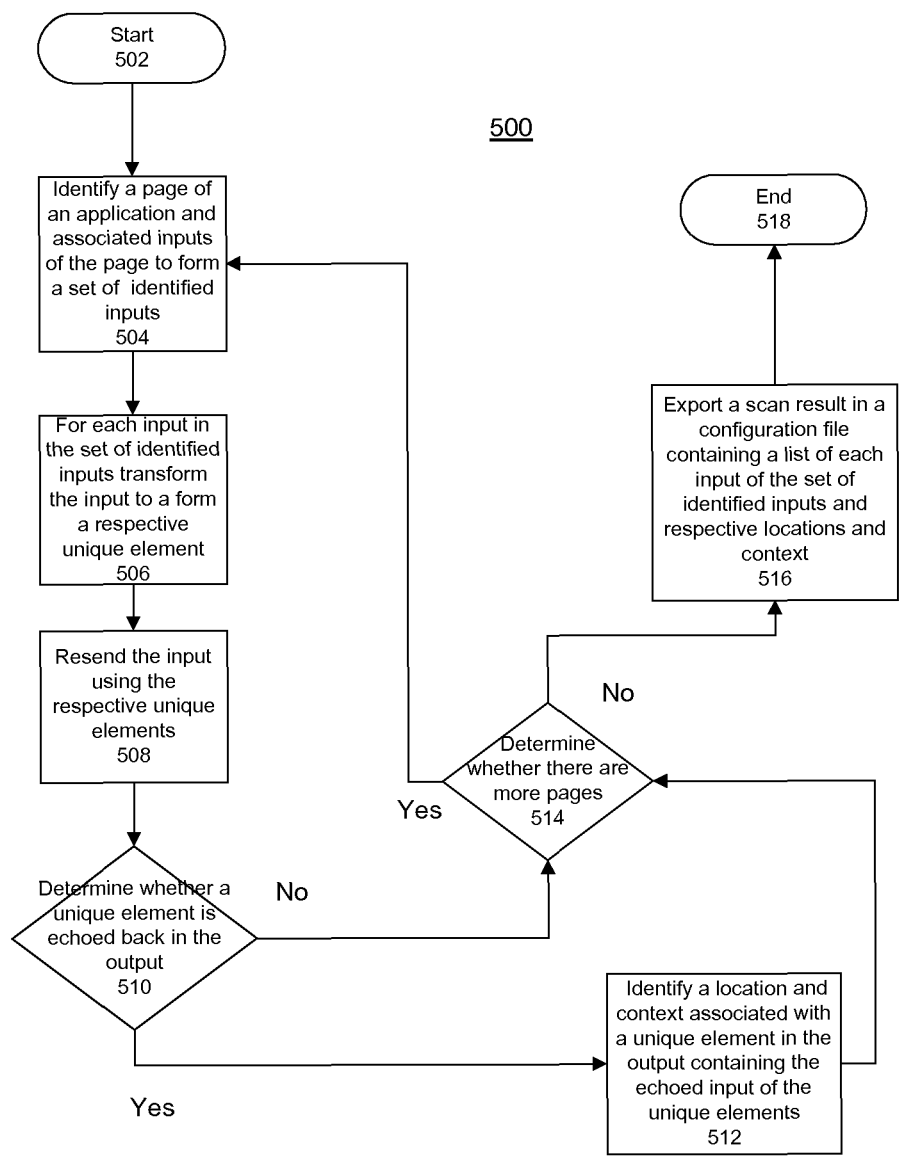
FIG. 5 is a flowchart of a configuration file creation process used with the process of FIG. 4, in accordance with a preferred embodiment of the present invention.

With reference to FIG. 5, a flowchart of a configuration file creation process used with the process of FIG. 4, in accordance with one embodiment of the disclosure is presented. Process 500 is an example of a configuration process used to create a configuration file, such as XML configuration file 324 of FIG. 3 containing identified input values including location and context information used with process 400 of FIG. 4.

The description of the embodiment uses the following example:
Request: http://server/welcome.jsp?name=John
Response:

```
<html><body>
    <H1>Hello, John</H1>
<script><![CDATA[
var user = "John";
//...
]]></script>
    </body></html>
```

In one embodiment, a scanner, such as scanner 322 of FIG. 3, detects all locations where user input is echoed back in an output. To identify the locations, the scanner would spider a Web application-containing site, discovering all the pages and the inputs of a Web application including cookies, form fields, and paths. For each such input, modify the input value to be something unique, such as "AppScan_Value", resend the input, and determine whether that value is echoed back in the output. If the value is echoed back in the output, the scanner notes the input that was modified, for example, the universal resource locator (URL), parameter name, the location(s) and context(s) in the output containing the echoed back input. On completion of the scan, the scanner exports a list of these locations, for example in an extensible markup language format.

Web application security scanners, that are currently available, already spider, modify values and create configurations for many existing tests, reducing the effort required to add this additional payload. A first implementation may only care about inputs that are actually vulnerable to cross-site scripting attacks, and simply skip echoed-back inputs that were deemed not vulnerable for cross-site scripting attacks likely because typical code solutions were available.

In the example above, the scanner in an illustrative embodiment indicates the parameter "name" on universal resource locator "http://server/welcome.jsp" is echoed back in the output twice, detailing the location and context of each.

Process 500 begins (step 502) and identifies a page of a Web application and associated inputs of the page to form a set of identified inputs (step 504). Location information and context information associated with the location is captured. For each input in the set of identified inputs process 500 transforms the input to a form a unique element (step 506). Process 500 forms a unique element to identify the input value as a potential injection attack value.

Process 500 resends an input using the unique element (step 508). The unique element is representative of the scanned input value. Process 500 determines whether the unique element is echoed back in an output (step 510). When a determination is made that the unique element is echoed back in the output, a "yes" result is obtained. When a determination is made that the unique element is not echoed back in the output, a "no" result is obtained. When a "no" result is obtained in step 510, process 500 skips ahead to step 514.

When a "yes" result is obtained in step 510 process 500 identifies a location and context in the output containing the echoed input of the unique element (step 512). Process 500 determines whether there are more pages to process (step 514). When a determination is made that there are more pages to process, a "yes" result is obtained. When a determination is made that there are no more pages to process, a "no" result is obtained. When a "yes" result is obtained in step 514, process 500 lops back to step 504 to process remaining pages.

When a "no" result is obtained in step 514, process 500 exports a scan result in a configuration file containing a list of identified locations (step 516) with process 500 terminating thereafter (step 518). Each identified input value with associated location and context information is placed as an entry in the resulting configuration file used by the encoder, such as encoder 328 of FIG. 3.

Thus is provided in an embodiment, a computer-implemented process for mitigating injection attacks, monitors all incoming and outgoing traffic to form monitored traffic, determines whether a unique element is matched with an input value of the monitored traffic to form a matched input value and responsive to a determination that the unique element is matched with an input value of the monitored traffic, saves the matched input value. The computer-implemented process further determines whether a output returned contains the matched input value in an expected location and responsive to a determination that the output contains the matched input value in an expected location, encodes the matched input value using a respective definition from the configuration file and returns the output to the requester.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A method for preventing malicious code being embedded within a scripting language of a web application accessed by a web browser, the method comprising:
    monitoring all incoming traffic, generated by the web browser, and outgoing traffic generated by a server;
    identifying a page of the web application and inputs associated with the page to form a set of identified inputs associated with the page;
    transforming each identified input associated with the page to have a unique element representative of an input value of that identified input associated with the page;
    sending the monitored incoming traffic including each transformed input having a unique element representative of an input value of that transformed identified input to the server;
    determining whether a given unique element, defined in a configuration file, is matched with an input value of the monitored incoming traffic to form a matched input value;
    responsive to a determination that the given unique element is matched with an input value of the monitored incoming traffic, saving the matched input value;
    determining whether an output from the server contains the matched input value in an expected location in the output from the server;
    responsive to a determination that the output from the server contains the matched input value in an expected location in the output from the server, encoding the matched input value using a definition from the configuration file; and
    returning the output from the server to a requester.

2. A method as claimed in claim 1 wherein determining whether an output from the server contains the matched input value in an expected location in the output from the server further comprises:
    determining whether the given unique element is identified in the output from the server; and
    identifying a location and context associated with the given unique element identified in the output from the server, wherein determining and identifying further comprises embedding of unique test values in the monitored incoming traffic sent fo the server.

3. A method as claimed in claim 2, wherein identifying a location and context associated with the given unique element identified in the output from the server further comprises:
    exporting a scan result containing a list of identified locations in the configuration file.

4. A method as claimed in claim 1, wherein the configuration file contains a list of each input of the set of identified inputs and expected output locations and context of each input of the set of identified inputs.

5. A method as claimed in claim 1, wherein responsive to a determination that the given unique element is not matched with the input value of the monitored incoming traffic returning to monitoring all incoming and outgoing traffic.

6. A method as claimed in claim 1 wherein responsive to a determination that the output from the server does not contain the matched input value in an expected location in the output from the server, encoding the matched input value using a default definition.

7. A computer program product for preventing malicious code being embedded within a scripting language of a web application accessed by a web browser, the computer program product comprising:
    a computer-readable storage medium having computer-readable program code embodied therein, the computer-readable program code comprising:
    computer-readable program code configured to monitor all incoming traffic, generated by the web browser, and outgoing traffic generated by a server;
    computer-readable program code configured to identify a page of the web application and inputs associated with the page to form a set of identified inputs associated with the page;
    computer-readable program code configured to transform each identified input associated with the page to have a unique element representative of an input value of that identified input associated with the page; and
    computer-readable program code configured to send the monitored incoming traffic including each transformed input having a unique element representative of an input value of that transformed identified input to the server;
    computer-readable program code configured to determine whether a given unique element, defined in a configuration file, is matched with an input value of the monitored incoming traffic to form a matched input value;
    computer-readable program code, responsive to a determination that the given unique element is matched with an input value of the monitored incoming traffic, configured to save the matched input value;
    computer-readable program code configured to determine whether an output from the server contains the matched input value in an expected location in the output from the server;
    computer-readable program code, responsive to a determination that the output from the server contains the matched input value in an expected location in the output from the server, configured to encode the matched input value using a definition from the configuration file; and
    computer-readable program code configured to return the output from the server to a requester.

8. The computer program product claim 7, wherein the computer-readable program code configured to determine whether an output from the server contains the matched input value in an expected location in the output from the server further comprises:
    computer-readable program code configured to determine whether the given unique element is identified in the output from the server;
    computer-readable program code configured to identify a location and context associated with the given unique element identified in the output from the server; and
    computer-readable program code configured to embed unique test values in the monitored incoming traffic sent to the server.

9. The computer program product claim 8, wherein the computer-readable program code configured to identify a location and context associated with the given unique element identified in the output from the server further comprises:
    computer-readable program code configured to export a scan result containing a list of identified locations in the configuration file.

10. The computer program product claim 7, wherein the configuration file contains a list of each input of the set of identified inputs and expected output locations and context of each input of the set of identified inputs.

11. The computer program product claim 7, further comprising computer-readable program code configured to return to monitoring all incoming and outgoing traffic in response to a determination that the given unique element is not matched with the input value of the monitored incoming traffic.

12. The computer program product claim 7, further comprising computer-readable program code configured to encode the matched input value using a default definition in response to a determination that the output from the server does not contain the matched input value in an expected location in the output.

* * * * *